(12) United States Patent
Meier (10) Patent No.: US 6,603,539 B1
(45) Date of Patent: Aug. 5, 2003

(54) METHOD FOR DETECTING THE SPATIAL POSITION OF A TRACKING MIRROR AND A MIRROR ARRANGEMENT FOR CARRYING OUT SAID METHOD

(75) Inventor: Dietrich Meier, Niedererlinsbach (CH)

(73) Assignee: Leica Geosystems AG, Unterentfelden (CH)

( * ) Notice: Subject to any disclaimer, the term of this patent is extended or adjusted under 35 U.S.C. 154(b) by 0 days.

(21) Appl. No.: 10/089,779

(22) PCT Filed: Sep. 28, 2000

(86) PCT No.: PCT/CH00/00528

§ 371 (c)(1),
(2), (4) Date: Jun. 13, 2002

(87) PCT Pub. No.: WO01/25722

PCT Pub. Date: Apr. 12, 2001

(30) Foreign Application Priority Data

Oct. 6, 1999 (CH) .............................................. 1828/99

(51) Int. Cl.⁷ ......................... G01B 11/26; G01B 11/02; G01C 17/00
(52) U.S. Cl. .............................. 356/139.03; 356/152.3; 356/508; 702/153
(58) Field of Search .................... 356/139.03, 152.3, 356/152.2, 508; 702/153

(56) References Cited

U.S. PATENT DOCUMENTS

| 4,600,308 | A | * | 7/1986 | Waite |
| 4,714,339 | A | | 12/1987 | Lau et al. |
| 4,834,531 | A | * | 5/1989 | Ward |
| 5,724,130 | A | | 3/1998 | Wang |

FOREIGN PATENT DOCUMENTS

| EP | 0 704 685 A1 | 4/1996 |
| EP | 0 919 830 A2 | 6/1999 |
| WO | WO 93/05360 | 3/1993 |

* cited by examiner

Primary Examiner—Stephen C. Buczinski
(74) Attorney, Agent, or Firm—Oppedahl & Larson LLP (57) ABSTRACT

In a laser tracking system equipped for interferometric distance measurement there are provided at least two retroreflectors (3.1, 3.2, 3.3) which are connected to the target tracking mirror (1) in a manner such that their position changes when the spatial orientation of the target tracking mirror (1) is changed. Secondary measurement beams (4.1, 4.2, 4.3) deflected out of the primary measuring beam (4) of the laser tracking system are directed onto the retroreflectors (3.1, 3.2, 3.3.). Path length changes in the beam path of the secondary measurement beams (4.1, 4.2, 4.3) are interferometrically measured and the readings are used for computing the spatial orientation of the target tracking mirror (1).

20 Claims, 5 Drawing Sheets

METHOD FOR DETECTING THE SPATIAL POSITION OF A TRACKING MIRROR AND A MIRROR ARRANGEMENT FOR CARRYING OUT SAID METHOD

The invention relates to a method according to the preamble of the first independent patent claim. The method serves for determining the spatial orientation of a target tracking mirror in a laser tracking system. The system further relates to a mirror arrangement according to the corresponding independent patent claim, said mirror arrangement serving for carrying out the method.

The target tracking mirror is an essential component of laser tracking systems as they have been known for many years now in industry and are used for precise coordinate measurements on large subjects. Laser tracking systems permit the tracking of a moving target retroreflector with a tracking measurement beam, wherein by way of suitable measurements of the direction of the measurement beam and by way of interferometric measurements of the distance to the target retroreflector the coordinates (e.g. polar coordinates) of the target retroreflector are determined.

Directing the tracking measurement beam in a manner such that it always impinges the moving retroreflector is effected by suitably adjusting the target tracking mirror which usually is rotatable about two axes standing perpendicular to one another. The tracking measurement beam is reflected back by the retroreflector to the target tracking mirror and from this is deflected to the interferometer receiver. The interferometer receiver determines the distance of the target retroreflector to a defined zero position of the laser interferometer. The spatial orientation of the target tracking mirror is determined by measurement and from the readings the direction of the measurement beam is computed.

For rotating the target tracking mirror about the axes usually servomotors assembled on the axes are provided. For determining the orientation of the target tracking mirror, with respect to a pregiven zero orientation usually each of the axes is equipped with an angle encoder. A typical laser tracking system equipped in such a manner with a target tracking mirror is for example described in the publication U.S. Pat. No. 4,714,339. This system comprises a target tracking mirror arranged in a cardanic suspension and therefore being rotatable about two axes standing perpendicular to one another.

In *Applied Optics,* Volume 2, No. 7, July 1963, page 762 ff. the use of a Michelson interferometer is described as an alternative to angle encoders for angle measurement in order to determine the rotational movement in a gamma beam spectrometer. The Michelson interferometer is a two-armed interferometer with two equally long arms, one for the reference beam path and the other for the measurement beam path. In the described application the measurement beam is directed in an unchangeable manner towards a die-corner prism, the prism being arranged on a part which is rotatable about an axis. The measurement beam is deflected by the prism to a stationary mirror and by the mirror to the same path back to the interferometer. Between the interferometer and prism, the measurement beam runs parallel to a tangent on the circular arc described by the prism on rotating about the axis. The reference beam is reflected by a stationary mirror to the interferometer. With rotation of the prism about the rotational axis the measurement beam path is lengthened or shortened and this is interferometrically detected. From the change of the path length of the measurement beam path when moving the prism from a predetermined zero position to a momentary position the rotational angle of the prism with respect to this zero position is calculated.

The described arrangement of prism and mirror renders it necessary for the measurement beam to eccentrically impinge the same prism side in every possible rotational position of the prism. This means that the opening of the prism and thus the prism itself must be relatively large. Therefore, the prism is relatively heavy so that it may influences the moment of inertia of the rotating part in a relevant manner.

It is the object of the invention to provide a method for determining the spatial orientation of a target tracking mirror in a laser tracking system, wherein the method according to the invention with respect to known methods for determining the spatial orientation of such a target tracking mirror is to permit a higher accuracy and wherein the method is to permit a very compact mirror arrangement in which the parts to be moved with the mirror are to be as light as possible so that as small as possible inertia stands in the way of a movement of the mirror. It is furthermore the object of the invention to provide a mirror arrangement for carrying out the method according to the invention. This arrangement is to be compact and possibly able to be integrated into known laser tracking systems in a modular manner.

This object is achieved by the method and the device as defined in the independent patent claims. Further advantageous embodiments of the invention are the subject-matter of the dependent claims.

The method according to the invention is based on the idea of determining the spatial orientation of the target tracking mirror of the laser tracking system not with the help of angle encoders arranged on rotational axes but with interferometric methods. For this purpose at least two retroreflectors are connected to the target tracking mirror and are therefore moving together with the target tracking mirror. For each one of the reflectors a secondary interferometric measurement system is provided, wherein the measurement and reference beams of the secondary measurement systems are branched out of the primary beam path of the laser tracking system. In each secondary measurement system a secondary measurement beam with an unchangeable direction is directed onto one of the retroreflectors moving with the target tracking mirror and the change of the length of the beam path of the secondary measurement beam is interferometrically determined when the mirror is moved. Retroreflectors and secondary measurement systems are arranged such that mirror movements effect path length changes for the secondary measurement beams and that the measurement data gained from such path length changes which characterize distances of a momentary reflector position from a predetermined zero position in the direction of the measurement beam, allow unambiguous computation of the mirror orientation.

The movements of a target tracking mirror are usually rotation movements in which the retroreflectors allocated to the secondary measurement systems move on a circular arc also. Each secondary measurement beam is directed tangentially onto such a circular arc, advantageously in a manner such that it impinges the retroreflector essentially centrally when located in a middle position. Since the direction of the secondary measurement beam always remains the same but the reflector does not move in a straight line in the measurement beam path but on a circular path, it is evident that the movement of the reflector detected by the measurement beam is limited. The parallel shift of the reflected measurement beam relative to the incident measurement beam which is caused by eccentric incidence of the measurement beam onto the reflector is compensated by beam widening optics.

In order to compute the orientation of the mirror surface of any moving mirror it is theoretically necessary to measure the spatial positions of three points arranged stationary relative to the mirror surface. For determining the orientation of a mirror rotatable about two stationary intersecting axes the evaluation of the position of two such points is sufficient.

The method according to the invention is advantageously carried out using an interferometer with a non-shifted return beam (single beam interferometer) which works according to the heterodyne principle. A frequency difference between the measurement beam and the reference beam is evaluated and therefore an arm for the reference beam path as necessary in the Michelson interferometer is not needed. A part of the laser beam is branched off as a reference beam and is led directly to the interfermometer receiver, the remaining light of the laser beam is frequency-shifted by way of an acousto-optical modulator and serves as measurement beam, i.e. runs through the measurement beam path to the measurement object, is reflected on this and is then led to the interferometer receiver. The interferometer detects the interference, i.e. a signal at a frequency which arises with the superposition of the measurement beam with the reference beam and which corresponds to the modulation frequency plus/minus the Doppler frequency. Subsequent electronics compares this signal with respect to phase and frequency to the original modulation frequency and produces per traversed half wavelength, according to the direction, a positive or negative count impulse.

The secondary measurement beams are advantageously branched out of the beam path of the primary measurement system, after the mentioned modulator so that only one laser source and only one modulator need be provided.

According to the invention, the arrangement of the target tracking mirror for a laser tracking system comprises means for changing the orientation of the mirror from a predetermined zero orientation and at least two retroreflectors co-moving with the mirror. Furthermore, it comprises means for deflecting measurement and reference beams of at least two secondary measurement systems out of the beam path of the laser tracking system, means for directing in each case one secondary measurement beam onto one of the retroreflectors connected to the target tracking mirror, means for interferometric analysis of the secondary measurement beams reflected by the retroreflectors for detecting path length changes in the beam paths as well as means for computing the spatial orientation of the target tracking mirror from the measured path length changes.

The target tracking mirror is for example in a known manner mounted in a cardanic suspension and is rotatable about two axes orthoganal to one another, for which suitable drives are provided.

The method according to the invention and the device according to the invention are described in detail by way of the following Figs. wherein.

Figure 1:
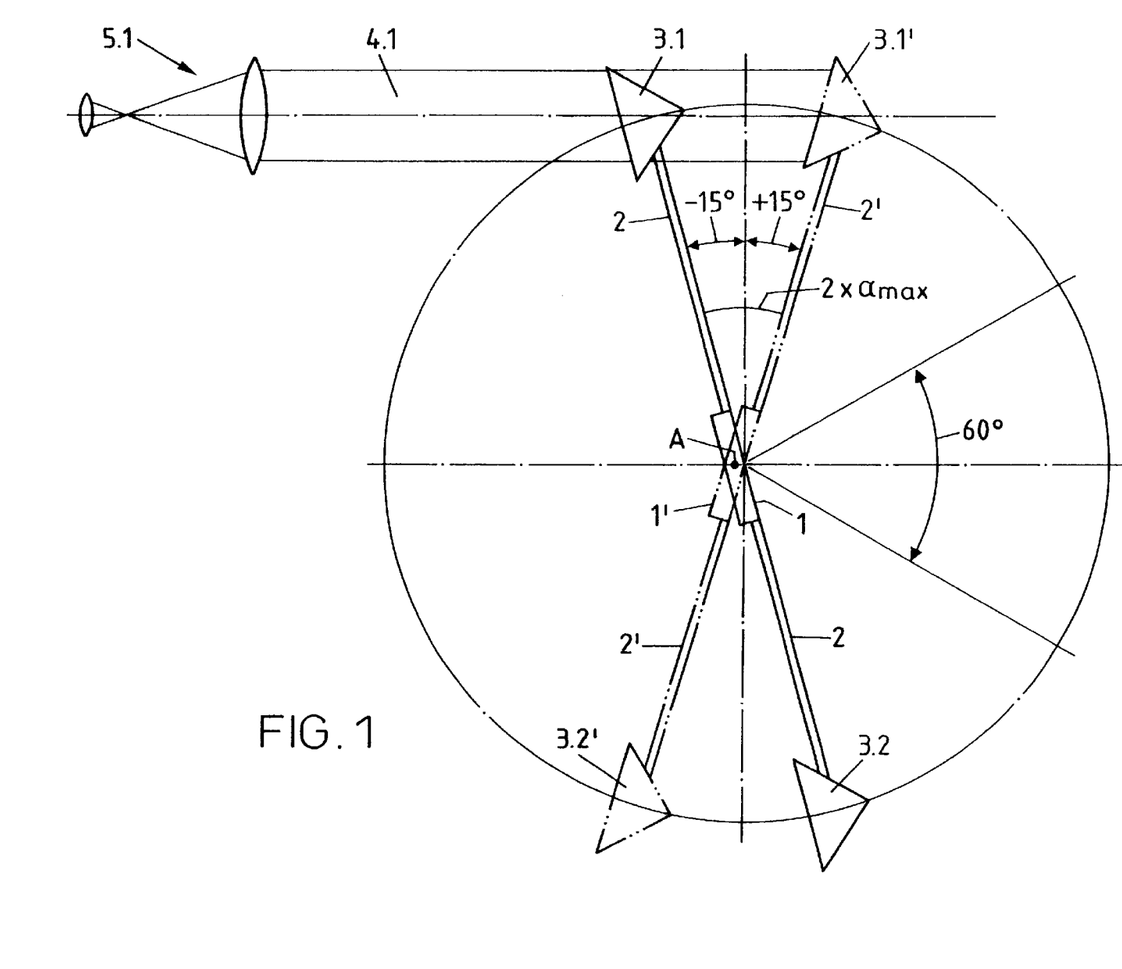
FIG. 1 shows the principle of determining the spatial orientation of a target tracking mirror using an exemplary embodiment of the method according to the invention.

FIG. 1 illustrates on an exemplary embodiment the principle of the invention serving for determining the spatial orientation of a target tracking mirror. The Figure shows a target tracking mirror 1 rotatable about an axis A with a mirror surface perpendicular to the paper plane. Parallel to the mirror surface and perpendicular to the rotational axis A there runs a connection rod 2 which is rotatable with the mirror about the rotational axis A and on whose ends there is mounted in each case one retroreflector 3.1 and 3.2. The target tracking mirror 1, the connection rod 2 and the retroreflectors 3.1, and 3.2 are shown in two rotational positions, wherein the reference numerals of the parts are characterized in the one rotational position with an apostrophe.

A secondary measurement beam 4.1 (in front of the reflector brought to a diameter corresponding essentially to the reflector opening by way of beam widening optics 5.1) is directed tangentially to the circular arc described by the reflector 3.1 on rotation of the target tracking mirror 1 and advantageously such that in a middle reflector position it centrically impinges the reflector. The measurement beam 4 is reflected in the retroreflector 3.1 and in a manner yet to be shown together with a suitable secondary reference beam is led to an interferometer allocated to the retroreflector 3.1.

On pivoting mirror 1 and reflectors 3.1 and 3.2 the path length of the secondary measurement beam 4.1 changes, wherein path length changes between a predetermined zero position (e.g. defined by mechanical abutment or optically) and a momentary position are interferometrically detected and measured. The orientation of the mirror 1 (characterized by the rotation angle $\alpha$) is unambiguously determined by the path length change of the secondary measurement beam 4.1 which is effected by a displacement of the retroreflector 3.1 from its zero position (for the zero orientation of the mirror) into another momentary position.

A secondary measurement system directed in an analogous manner onto the second retroreflector 3.2 (not shown in FIG. 1) measures an equally large path length change with a reversed polarity.

The measurement range of the arrangement shown in FIG. 1 (angle range between two mirror orientations with maximal pivoting still detectable by the measurement beam 4.1) is dependent on the size of the reflector, on its distance from the rotational axis A and on the optical means with which the secondary measurement beam is produced and analyzed. The further the reflector is distanced from the rotational axis A the larger becomes the eccentricity of the beam incidence with the same rotation of the mirror, that is to say the measurement range becomes smaller. On the other hand with an increasing distance between the retroreflector and the rotational axis the measurement resolution becomes larger. It has been shown that for usual applications using triple prism reflectors in a ball with a diameter of approx. 12 mm a sufficient measurement resolution is achieved with a distance between the reflector 3.1 and the rotational axis A in the region of approx. 100 mm. In such an arrangement there results a maximum rotation of the mirror 1 out of its middle orientation by an angle $\alpha_{max}$ of ±15°, which for the primary measurement beam of the laser tracking system deflected by the target tracking mirror means a maximum pivoting range of approx. ±30° (effective measurement range of the laser tracking system).

FIG. 1 shows the target tracking mirror 1 and the reflectors in their positions which are as far as possible from the middle position (rotational angle equal to ±15°). The measurement range of 60° for the whole arrangement is indicated with interrupted lines.

For a mirror arrangement with a pivoting range limited in the above mentioned manner, it is possible to use more simple and smaller motors for the mirror pivoting than this is common in the state of the art. Therefore, the mirror arrangement can be designed very compact. In particular so-called limited angle torque motors functioning according to the galvanometer system are suitable. In order to further reduce the moment of inertia of the parts moved with the mirror it is also possible to arrange suitable motors not movable with the target tracking mirror, but in a stationary way and to couple them with suitable force transmission means (e.g. cable pulls) to the parts of the mirror arrangement to be moved.

Figure 2:
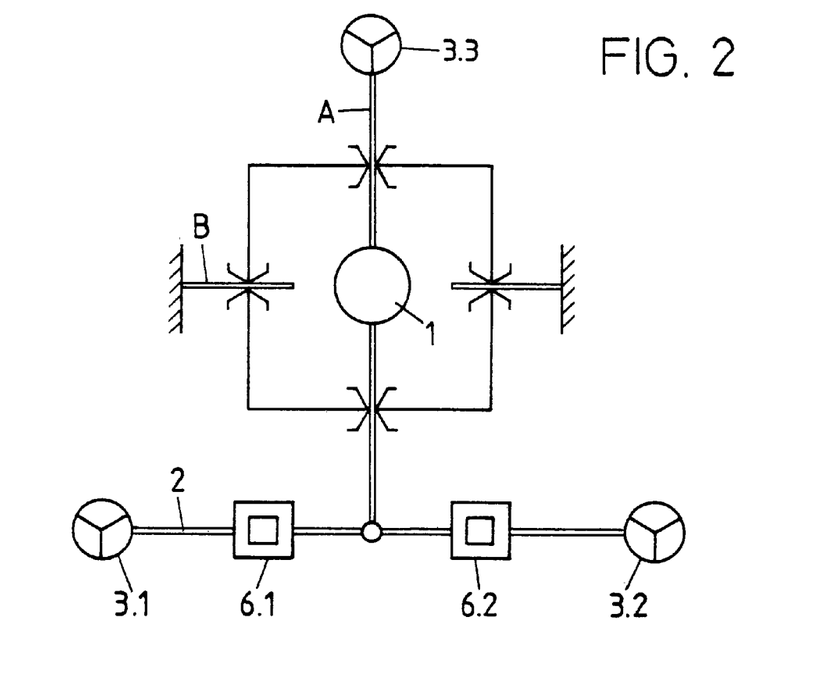
FIGS. 2, 3 and 4 show for an exemplary embodiment of the mirror arrangement according to the invention, in various views, target tracking mirror, mirror suspension, drives for changing the mirror orientation and retroreflectors.
Figure 3:
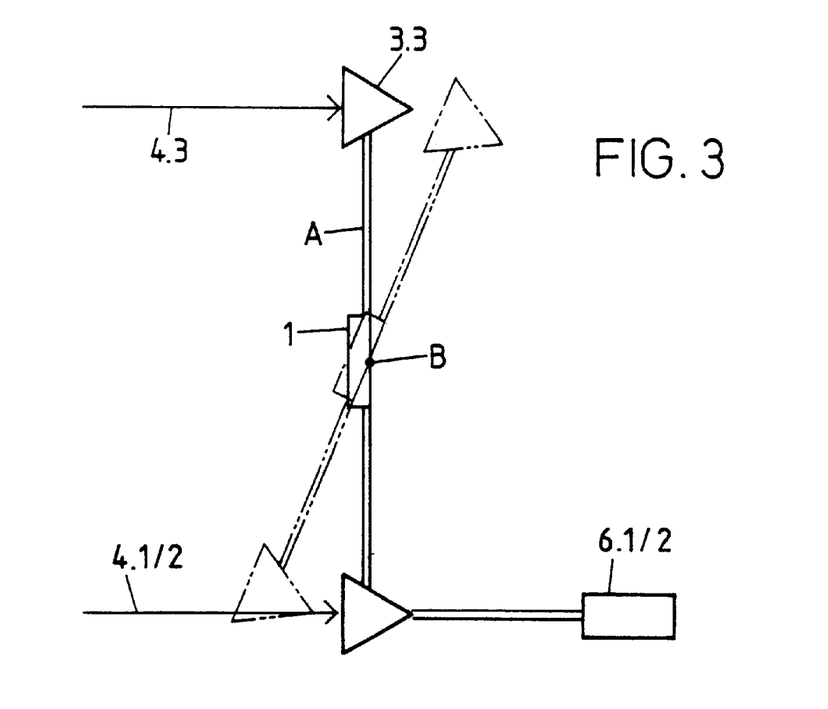
Figure 4:
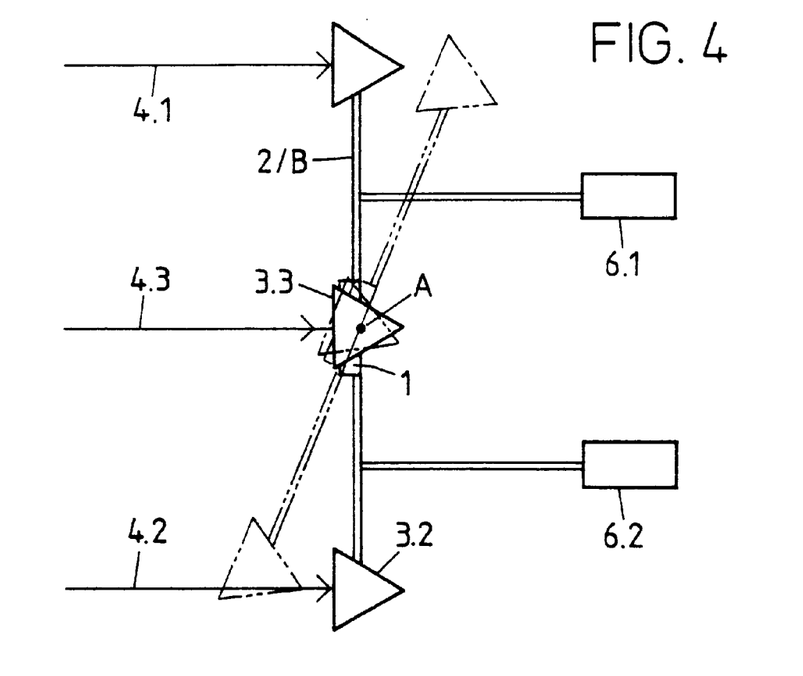

FIGS. 2, 3 and 4 show three different views of the target tracking mirror 1, a mirror suspension with drives for changing the orientation of the mirror and retroreflectors for determining the mirror orientation of an advantageous embodiment of the mirror arrangement according to the invention.

The mirror suspension is a cardanic suspension in which the mirror is rotatable about an "inner" axis A and independently of this about an "outer" axis B. The two axes A and B are perpendicular to one another, intersect and run parallel to the mirror surface of the target tracking mirror 1. FIG. 2 shows the arrangement with a viewing angle perpendicular to the mirror surface (mirror with middle orientation), FIG. 3 with a viewing direction perpendicular to the inner axis A (mirror in unbroken lines having a middle orientation and dot-dashed in a position pivoted about the axis B) and in FIG. 4 with the viewing direction perpendicular to the outer axis B (mirror in unbroken lines having a middle orientation and dot-dashed in a position pivoted about the axis A).

The mirror arrangement comprises three retroreflectors 3.1 to 3.3, wherein the reflectors 3.1 and 3.2 are arranged as shown in FIG. 1 at the ends of a connection rod 2 rotatable with the mirror 1 about the inner axis A and reflector 3.3 is arranged on an extension of the inner axis A.

FIGS. 2 to 4 likewise show schematically drives 6.1 and 6.2 engaging the connection rod 2 for rotation of the mirror about the inner axis A. The drives are for example stationarily mounted motors which for example via pull cables are interactively connected to the parts to be moved. In the same way, threaded rods may be provided as force transmission means, wherein then the motors are to be assembled with a pivotable axis and a rotationally secured stator.

All three retroreflectors 3.1 to 3.3 advantageously form the corners on an essentially equilateral triangle in whose center the intersection point of the two axes A and B and the center of the target tracking mirror 1 are arranged. This arrangement essentially yields the same sensitivity differences for measurement of the rotation about the two axes A and B.

Secondary measurement beams 4.1 to 4.3 are directed onto each retroreflector 3.1 to 3.3 advantageously parallel to one another and perpendicular to the mirror surface with a middle orientation of the target tracking mirror 1.

A determination of the mirror orientation with the help of three retroreflectors 3.1, 3.2, 3.3 moved with the mirror and three secondary measurement systems as illustrated in FIGS. 2 to 4 is independent of the mounting play of the suspension which leads to a very high accuracy.

Figure 5:
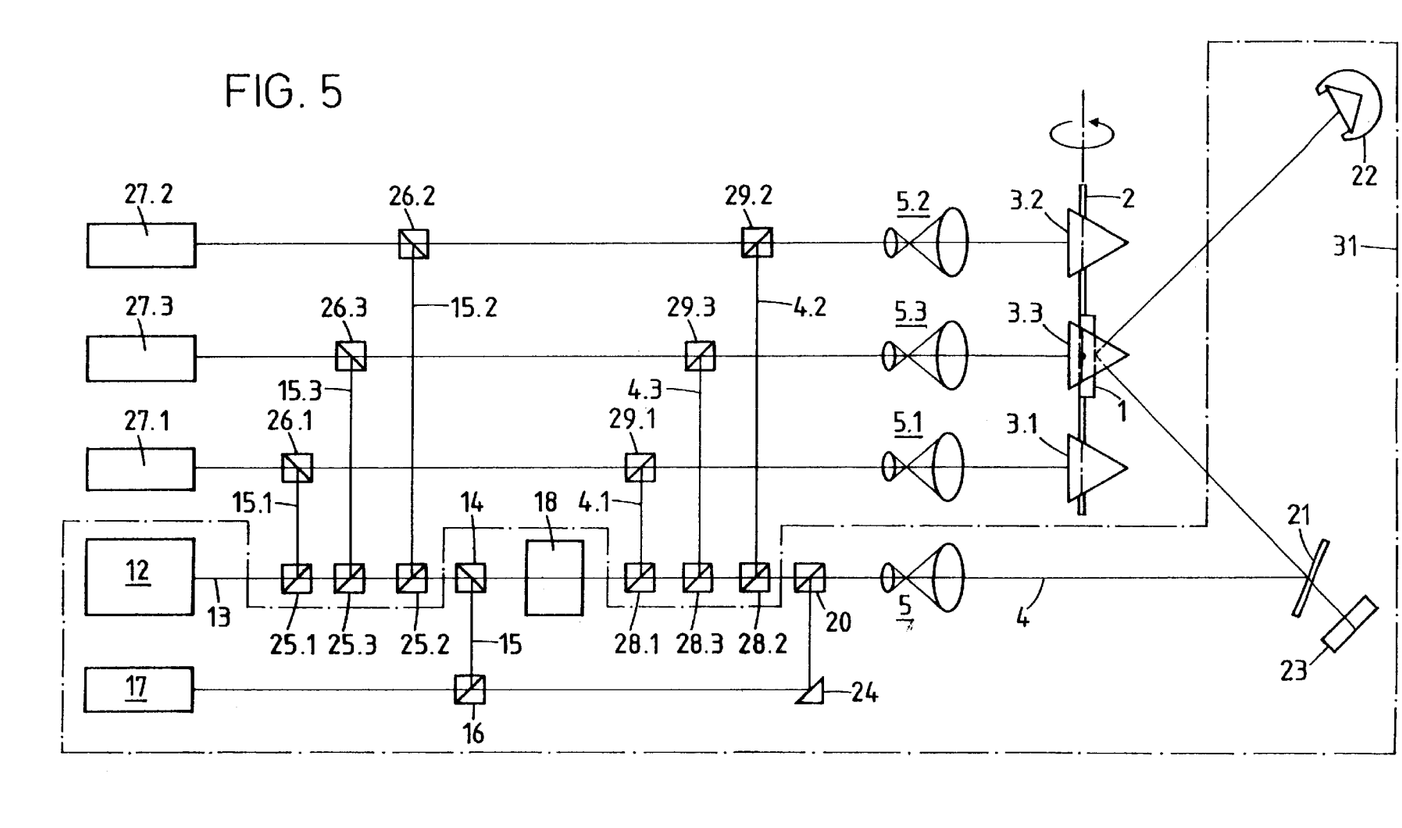
FIGS. 5 and 6 show two schemas of the mirror arrangement according to FIGS. 2 to 4 illustrating the optical arrangement for carrying out the method according to the invention (FIG. 5: block schema, FIG. 6: three-dimensional schema of the beam paths)
Figure 6:
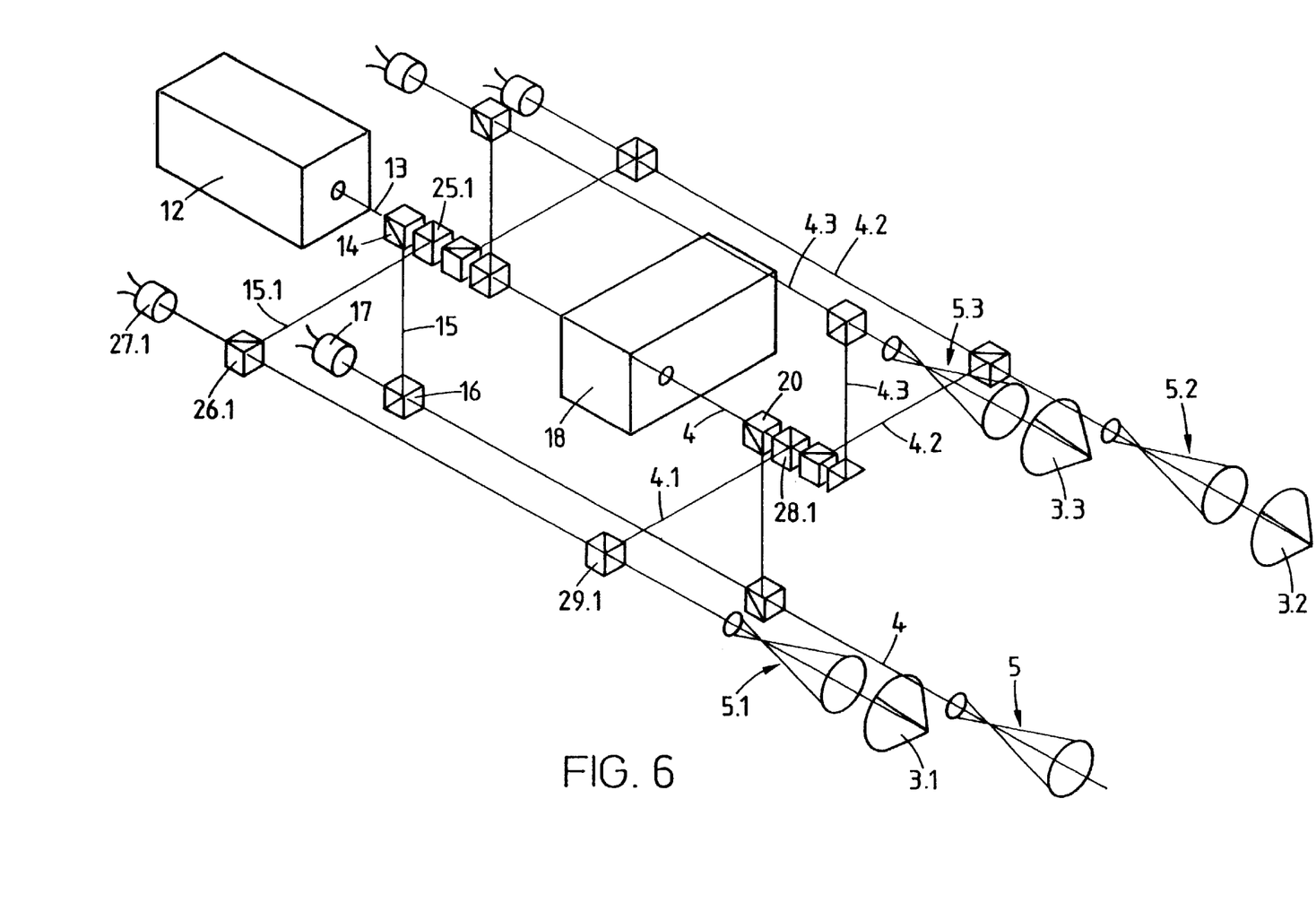

FIGS. 5 and 6 show in particular the optical elements and beam paths of a laser tracking system in which the orientation of the target tracking mirror 1 of a mirror arrangement according to FIGS. 2 to 4 is determined with the help of the method according to the invention. FIG. 5 is a sort of block schema and also shows the mirror arrangement (view as in FIG. 4), the target retroreflector 22 and parts of the control system for tracking the primary measurement beam 4. FIG. 6 is a three-dimensional representation of the beam paths of an optical arrangement which deviates slightly from the arrangement according to FIG. 5 and which serves the same purpose. The elements already described in combination with the FIGS. 1 to 4 are denominated with the same reference numerals.

The primary and secondary measurement systems shown in the FIGS. 5 and 6 function according to the heterodyne method described briefly further above. The optical elements and their functions in the whole system are described in the following sections, in particular relating to FIG. 5.

A laser 12 of a laser tracking system emits a laser beam 13 with a very large coherence length. From this laser beam 13, a primary reference beam 15 is decoupled by a beam splitter 14 and then deflected by beam splitter 16 to be directed directly to an interferometer receiver 17. The portion of the laser beam 13 passing through beam splitter 14 runs through an acousto-optic modulator 18 and leaves this as a frequency-shifted, primary measuring beam 4. This beam runs through a beam splitter 20 and beam widening optics 5 and is then deflected by a beam splitter 21 towards the target tracking mirror 1 and from this is directed onto the target retroreflector 22 (e.g. triple mirror, triple prism or cat eye). In the retroreflector 22 the primary measurement beam 4 is folded in itself and via the target tracking mirror 1 falls back to the beam splitter 21. A portion of the primary measurement beam 4 reflected in the retroreflector 22 passes the beam splitter 21 and falls onto a position-sensitive detector 23. This detector determines the target error of the primary measurement beam and generates corresponding signals which are used as a control variable for re-adjusting the target tracking mirror 1 by rotation. The target tracking mirror 1 is continuously rotated such that the tracking measurement beam 4 deflected to the target retroreflector 22 does not lose contact with the target retroreflector 22, but tracks it constantly.

The portion of the reflected primary measurement beam 4 which is reflected by beam splitter 21 runs through beam widening optics 5 in the reverse direction. Then it is deflected by the beam splitter 20 and via a deflecting mirror 24 is led through the beam splitter 16 to the interferometer receiver 17. The interferometer receiver 17 detects interference from the superposition of the primary reference beam 15 and the primary measurement beam 4. From the readings the distance of the target retroreflector 22 from a previously defined zero position is determined.

The primary measurement system 31 (in FIG. 5 boxed in with a dot-dashed line) with the components of the laser 12, acousto-optic modulator 18, beam widening optics 5, beam splitter 21, target retroreflector 22, position sensitive detector 23 and interferometer receiver 17 as well as the further beam splitters 14, 16, 20 and 24 required for beam deflection is a constructional unit being per se known and in which the target tracking mirror 1 is applied in a mirror arrangement according to the invention.

The mirror arrangement comprises three retroreflectors 3.1, 3.2, 3.3 and for the interferometric measurement of position changes of these reflectors, three secondary measurement systems which in each case function with a secondary measurement beam 4.1, 4.2, 4.3 and a secondary reference beam 15.1, 15.2, 15.3. The secondary measurement and reference beams are decoupled from the primary measurement system.

For this purpose, first a reference beam 15.1 for the secondary measurement system allocated to the retroreflector 3.1 is branched off the laser beam 13 with a beam splitter 25.1. This reference beam 15.1 is directed via a beam splitter 26.1 to an interferometer receiver 27.1 allocated to the retroreflector 3.1.

Out of the modulated primary measurement beam 4 a secondary measurement beam 4.1 allocated to the retroreflector 3.1 is branched off by a beam splitter 28.1. This measurement beam 4.1 is deflected via a beam splitter 29.1 to beam widening optics 5.1 and then impinges the retroreflector 3.1. Thus the secondary measurement beam 4.1 has reached the end of its measurement path, specifically the retroreflector 3.1 itself. From here the measurement beam 4.1 runs through beam widening optics 5.1 in the reverse direction and then through the beam splitter 29.1 and the beam splitter 26.1. Then it is, just as the reference beam 15.1, led to the interferometer receiver 27.1. This interferometer receiver 27.1 detects the interference from superposition of the secondary reference beam 15.1 and of the secondary measurement beam 4.1. From the readings the migration of the retroreflector 3.1 from a previously defined zero position is determined.

The same applies in an analogous manner to the other two further, secondary measurement systems which are allocated to the retroreflectors 3.2 and 3.3.

Figure 7:
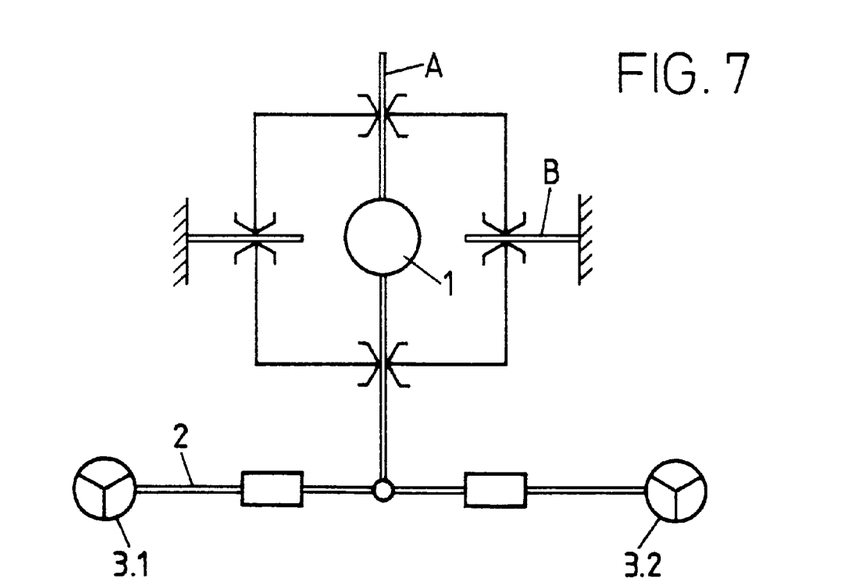
FIG. 7 shows a target tracking mirror, mirror suspension and retroreflectors of a second advantageous embodiment of the mirror arrangement according to the invention.

FIG. 7 shows a further embodiment of the mirror arrangement according to the invention, which corresponds to the arrangement according to FIGS. 2 to 4, however, without the third reflector 3.3 arranged on the inner rotational axis A and without a third secondary system. With the use of only two retroreflectors 3.1 and 3.2 and secondary measurement systems allocated to them, the central rotational point of the cardanic suspension is used as the third point for determining the orientation of the mirror surface. Although this point has an essentially stationary position, it is however dependent on the bearing play of the suspension so that the evaluation of the orientation of the target tracking mirror of the mirror arrangement according to FIG. 7 in contrast to the arrangement according to FIGS. 2 to 4 is dependent on the bearing play.

A rotation of the target tracking mirror of the mirror arrangement according to FIG. 7 about the inner axis A results in oppositely equal path length changes for the two secondary measurement systems allocated to the reflectors 3.1 and 3.2, a rotation about the outer axis B results in equal path length changes. From this relation together with the known position of the axes intersection point relative to the mirror surface the orientation of the mirror can be computed.

What is claimed is:

1. A method for determining the spatial orientation of a movable target tracking mirror of a laser tracking system in which the direction of a primary measurement beam is changed by changing the spatial orientation of the target tracking mirror, direction changes of the primary measurement beam are detected by determining the spatial orientation of the target tracking mirror, and path length changes in the beam path of the primary measurement beam are detected with interferometric methods; characterized in that from the primary measurement beam at least two secondary measurement beams and secondary reference beams allocated to the secondary measurement beams are branched off, that the secondary measurement beams are directed in an unchangeable direction towards in each case a retroreflector movable with the target tracking mirror, that changes of the path length of the secondary measurement beams on movement of the target tracking mirror out of a predetermined zero orientation into an orientation to be determined are interferometrically detected, and that the interferometrically detected path length changes are used for computing the orientation of the target tracking mirror.

2. A method according to claim 1, characterized in that the target tracking mirror is rotatable about at least one rotational axis and that the secondary measurement beams are directed tangentially on circular arcs on which the retroreflectors move on rotation of the target tracking mirror.

3. A method according to claim 1, characterized in that the target tracking mirror is rotatable about two rotational axes intersecting perpendicularly and arranged in parallel to the mirror surface, that the retroreflectors are arranged in a plane parallel to the mirror surface of the target tracking mirror and that the secondary measurement beams are parallel to one another and when the target tracking mirror has middle orientation, are directed perpendicularly onto the mirror surface.

4. A method according to claim 1, characterized in that three retroreflectors are arranged in a manner such that their positions determine the spatial orientation of the mirror surface of the target tracking mirror in an unambiguous manner.

5. A method according to claim 3, characterized in that two retroreflectors are arranged in a manner such that they together with the rotational axes unambiguously determine the spatial orientation of the mirror surface of the target tracking mirror.

6. A method according to claim 1, characterized in that path length changes of the beam paths of the primary and of the secondary measurement beams are interferometrically measured according to the heterodyne method.

7. A method according to claim 6, characterized in that a laser beam is modulated in a modulator into the primary measurement beam, that in front of the modulator one primary and at least two secondary reference beams are deflected out of the laser beam and that after the modulator the secondary measurement beams are deflected out of the primary measurement beam.

8. A method according to claim 2, characterized in that the target tracking mirror is rotatable about two rotational axes intersecting perpendicularly and arranged in parallel to the mirror surface, that the retroreflectors are arranged in a plane parallel to the mirror surface of the target tracking mirror and that the secondary measurement beams are parallel to one another and when the target tracking mirror has middle orientation, are directed perpendicularly onto the mirror surface.

9. A method according to claim 2, characterized in that three retroreflectors are arranged in a manner such that their positions determine the spatial orientation of the mirror surface of the target tracking mirror in an unambiguous manner.

10. A method according to claim 8, characterized in that two retroreflectors are arranged in a manner such that they together with the rotational axes unambiguously determine the spatial orientation of the mirror surface of the target tracking mirror.

11. A laser tracking system comprising:
    a target tracking mirror,
    means for changing the spatial orientation of the target tracking mirror,
    means for producing a primary measurement beam directed onto the target tracking mirror with a direction which is changeable by way of changing the spatial orientation of the target tracking mirror, means for interferometric detection of path length changes in the beam path of the primary measurement beam, and means for detecting the spatial orientation of the target tracking mirror for determining direction changes of the primary measurement beam, the means for determining the spatial orientation of the target tracking mirror comprising:

at least two retroreflectors which are connected to the target tracking mirror in a manner such that their position is changed when the orientation of the target tracking mirror is changed, means for deflecting, out of the primary measurement beam, at least two secondary measurement beams allocated in each case to one of said retroreflectors and secondary reference beams allocated to the secondary measurement beams, means for directing the secondary measurement beams onto in each case one of said retroreflectors, means for interferometrically analyzing secondary measurement and reference beams allocated to each other for detecting path length changes in the beam paths of the secondary measurement beams, and means for computing the spatial orientation of the target tracking mirror from the detected path length changes in the beam paths of the secondary measurement beams.

12. A mirror arrangement according to claim 11, characterized in that the means for detecting path length changes in the beam path of the primary and of the secondary measurement beams are interferometer measurement systems functioning according to the heterodyne method, that means for deflecting a primary reference beam out of a laser beam and a modulator for modulating the laser beam into the primary measurement beam are provided and that in front of the modulator there are provided means for deflecting out the secondary reference beams, which means for deflecting out the secondary measurement beams are arranged after the modulator.

13. A mirror arrangement according to claim 11, characterized in that the target tracking mirror is rotatably arranged about at least one rotational axis and that the secondary measurement beams are directed tangentially to circular arcs described by the retroreflectors on rotation of the target tracking mirror.

14. A mirror arrangement according to claim 13, characterized in that the target tracking mirror is mounted in a cardanic suspension in which it is rotatable about an inner axis and an outer axis, said axes intersecting perpendicularly and being arranged parallel to the mirror surface of the target tracking mirror.

15. A mirror arrangement according to claim 14, characterized in that the secondary measurement beams are directed parallel to one another and perpendicular to the mirror surface of the target tracking mirror when having a middle orientation.

16. A mirror arrangement according to claim 14, characterized in that two retroreflectors are arranged on a connection rod rotatable with the target tracking mirror about the inner axis.

17. A mirror arrangement according to claim 16, characterized in that a third retroreflector is arranged on the inner axis.

18. A mirror arrangement according to claim 17, characterized in that the three retroreflectors form an equilateral triangle which is arranged parallel to the mirror surface of the target tracking mirror and whose middle point is the projection of the axes intersection point.

19. A mirror arrangement according to claim 13, characterized in that for rotating the target tracking mirror there are provided stationary motors and force transmission means.

20. A mirror arrangement according to claim 19, characterized in that the force transmission means are pull cables or threaded rods.

\* \* \* \* \*